Nov. 20, 1945.  A. J. JONES  2,389,366
CHUCK
Filed May 20, 1943
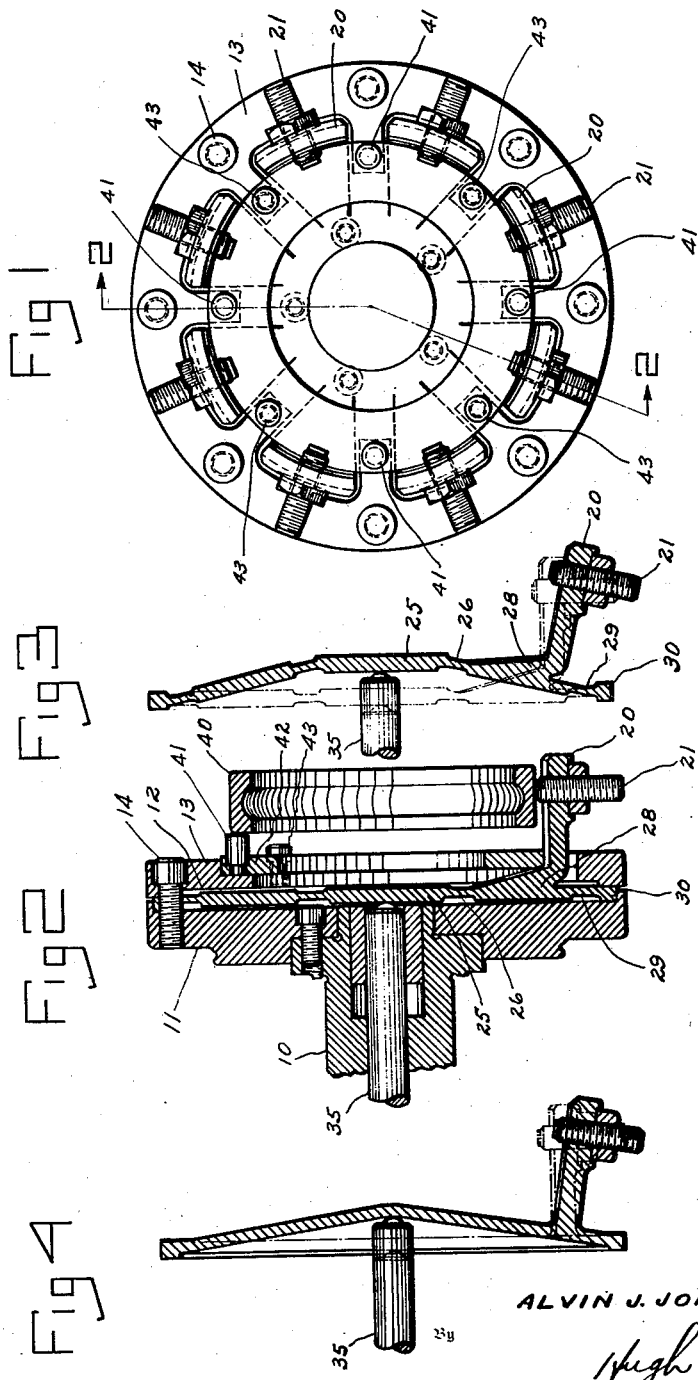
Inventor
ALVIN J. JONES
Hugh N Rocker
Attorney Patented Nov. 20, 1945

2,389,366

UNITED STATES PATENT OFFICE 2,389,366

CHUCK

Alvin J. Jones, Waynesboro, Pa., assignor to Landis Tool Company, Waynesboro, Pa.

Application May 20, 1943, Serial No. 487,742

2 Claims. (Cl. 279—46)

My invention relates to chucks particularly those using a flexible plate for actuating the jaws thereof.

Previous chucks of this type utilized a plate of substantially uniform section except perhaps at the point where the jaws are located. Even with a uniform section the stiffness of the plate varies with the radial position of the jaws. Furthermore, the maximum opening of the jaws with this type of diaphragm is less than half the movement of the operating rod. It is just enough to provide clearance for inserting or removing a work piece. Obviously such movement does not leave much for gripping the work.

In order to provide a better gripping action it is necessary that the jaws be made to open wider for a given axial movement of the operating rod. By selectively spacing short thin concentric sections on said plate the flexing characteristics of said plate may be accurately controlled so as to give a greater movement to the jaws for a given movement of the operating rod.

It is therefore an object of my invention to provide a chuck of the diaphragm type the jaws of which may be opened wide enough to permit good gripping action, and clearance for loading and unloading.

It is a further object of my invention to provide a chuck of the diaphragm type having concentrically spaced portions of thin section.

In the drawing

Figure 1 is an end elevation of my chuck.

Figure 2 is a front sectional elevation along the line 2—2 of Figure 1.

Figure 3 is a diagram of the flexing characteristics of a diaphragm using selected thin sections.

Figure 4 is a diagram of the flexing characteristics of a conventional diaphragm of uniform cross section.

In the drawing, numeral 10 indicates the headstock spindle of a metal working machine, 11 a face plate secured to said spindle. A diaphragm 12 is held against said face plate by means of a retaining plate 13. Said plate 13 is secured to face plate 11 by means of screws 14 spaced angularly around the outer edges thereof. Jaws 20 are angularly spaced about the face of diaphragm 12. Screws 21 inserted radially in said jaws provide adjustable gripping means for said jaws.

The diaphragm 12 consists of concentric heavy and thin sections which may be arranged in any suitable order. I prefer the section arrangement shown in Figure 3. In this figure the center portion 25 of the diaphragm is rigid, the next concentric portion 26 is flexible. The third concentric portion 28 carries the jaws 20 and is rigid. The fourth concentric portion 29 is flexible and the outer portion 30 is substantially the same thickness as the center portion since the screws 14 must pass thru this portion. This outer portion also provides the contact surface between the face plate 11 and the diaphragm and between said diaphragm and the retaining plate 13.

For the purposes of comparison a diagram of a conventional diaphragm chuck is shown in Figure 4. In both Figures 3 and 4 the operating rod is indicated by numeral 35.

When rod 35 is shifted to deflect a conventional chuck diaphragm, the deflection is distributed over substantially the entire surface thereof.

When rod 35 is shifted the same amount to deflect a chuck diaphragm of variable cross section the same amount of deflection must be concentrated in the concentric portions of light section. For this reason, the rigid portion which carries the jaws is displaced to a greater extent than any portion of a conventional diaphragm. The jaws on my variable section chuck diaphragm may be opened about 150 per cent wider than those on a conventional uniform section diaphragm for a given movement of operating shaft 35.

The work piece 40 may be located axially within the chuck jaws 20 by means of stops 41. Said stops are inserted in a ring 42 which is secured to plate 13 by means of screws 43. Work pieces of different diameters within a given range may be accommodated by use of a ring similar to ring 42 but having the stop members located at radial positions to suit the diameter in question.

I claim:

1. A chuck comprising a base member, a flexible plate secured thereto, jaws on said plate for gripping or releasing a work piece in response to flexing of said plate, and means for controlling the flexing of said plate which consists of substantially inflexible sections at the center of said plate and at the portion where said jaws are located and flexible sections between said inflexible sections and between said jaw section and the outer edge of said plate.

2. A chuck comprising a base member, a flexible plate secured thereto, said plate having an inflexible center portion, an inflexible outer portion and an inflexible intermediate portion, flexible portions connecting said intermediate portion with said other portions, said intermediate portion having work holding jaws extending laterally therefrom and means for flexing said plate.

ALVIN J. JONES.